United States Patent
Flegel

(10) Patent No.: US 8,030,799 B1
(45) Date of Patent: Oct. 4, 2011

(54) COMBINATION SWITCH AND CIRCUIT BREAKER

(75) Inventor: David D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 546 days.

(21) Appl. No.: 12/116,690

(22) Filed: May 7, 2008

(51) Int. Cl.
*H02J 7/00* (2006.01)
*H02J 9/00* (2006.01)

(52) U.S. Cl. .......................................... 307/64; 307/125

(58) Field of Classification Search .................... 307/43, 307/64, 113, 116, 125; 200/18
See application file for complete search history.

(56) References Cited

U.S. PATENT DOCUMENTS 6,570,269 B2 * 5/2003 McMillan et al. .............. 307/64

* cited by examiner

*Primary Examiner* — Jared Fureman
*Assistant Examiner* — Carlos Amaya
(74) *Attorney, Agent, or Firm* — Boyle Fredrickson, S.C.

(57) ABSTRACT

A combination switch and circuit breaker is operative as both a switch and circuit breaker when connecting a load to an auxiliary power supply, but is only operative as a switch when connecting the load to a main power supply. The combination switch and circuit breaker has a switch component for selectively connecting a load center branch circuit to either a main power supply or an auxiliary power supply. During main power interruption, for example, the switch component of the combination switch and circuit breaker may electrically connect a branch circuit of the load center to an auxiliary power supply, with a circuit breaking component providing current overload protection. However, during normal main power operation, the switch component electrically connects the load center branch circuit to main power, with a branch breaker and a main breaker providing current overload protection for the branch circuit.

9 Claims, 6 Drawing Sheets

COMBINATION SWITCH AND CIRCUIT BREAKER

BACKGROUND OF THE INVENTION

The present invention relates generally to transfer switches and, more particularly, to a combination transfer switch and circuit breaker.

Transfer switches are designed to selectively electrically connect a load to one of two power supplies. Representatively, a transfer switch may be used to connect an electrical load, to either a main power supply, such as a utility power supply, or an auxiliary power supply, such as an electric generator. In most conventional applications, the transfer switch will have a single-pole, double-throw switch for each branch circuit of a load center or main panel that is to be powered by the auxiliary power supply during interruption of the main power supply. Each switch is operable in either a LINE position, which is its normal operating position when the main power supply is supplying power to the branch circuit, or a GEN or AUX position in which the auxiliary power supply is used to supply power to the branch circuit. Conventional transfer switches have been designed to have separate branch circuit switches and circuit breakers for each branch circuit to be fed when connected to receive power from the auxiliary power supply.

Combination switch and circuit breakers have been designed to overcome some of the drawbacks associated with separate switch and circuit breaker arrangements. Specifically, single-pole, single-throw combination switch and circuit breakers have been developed to provide switching and circuit breaking functionality in a single device. While reasonably effective, these combination switch and circuit breakers are constructed to have only an ON position or an OFF position. That is, current flow is only permitted between a single power supply and a load (branch circuit) when the combination switch and circuit breaker is in the ON position. When in the OFF position, current is prevented from flowing from the power supply to the load. Because the combined device provides some overcurrent protection, it may automatically move to the OFF position if an excessive current condition is detected while in the ON position. While such combination devices have reduced the size and complexity of transfer switches, these combination devices only permit connection to a single power supply, typically the auxiliary power supply. Therefore, to connect the branch circuit to the main power supply, a switch device must be used that is separate from the switch device used to connect the branch circuit to the auxiliary power supply.

SUMMARY OF THE INVENTION

The present invention is directed to a combination switch and circuit breaker capable of receiving power from two independent power supplies and delivering power, with limited overcurrent protection, to a load or branch circuit to which the load is connected. More particularly, in one embodiment, the combination switch and circuit breaker is operative as both a switch and circuit breaker when connecting a load to an auxiliary power supply, but is only operative as a switch when connecting the load to a main power supply. The combination switch and circuit breaker has a switch component for selectively connecting a load center branch circuit to either a main power supply or an auxiliary power supply. During main power interruption, for example, the switch component of the combination switch and circuit breaker may electrically connect a branch circuit of the load center to an auxiliary power supply with a circuit breaking component providing current overload protection. However, during normal main power operation, the switch component electrically connects the load center branch circuit to main power with a branch breaker and/or a main breaker providing current overload protection for the branch circuit.

In accordance with one aspect of the present invention, a combination switch and circuit breaker assembly is disclosed as including a manually operated handle movable between a first position and a second position. The assembly further includes a switch mechanism disposed within the body as well as a circuit breaker mechanism disposed within the body and interconnected with the handle. When the handle is in the first position, a first electrical circuit is formed that includes the circuit breaker mechanism. When the handle is in the second position, a second electrical circuit independent of the circuit breaker mechanism is formed.

In accordance with another aspect, the present invention includes a transfer switch device having a first power terminal connectable to a first power supply and a second power terminal connectable to a second power supply. The switch device further includes a common terminal connectable to a load and a combination switch and circuit breaker positionable in either a first position or a second position. The combination switch and circuit breaker is constructed to be interconnected with the first power terminal when in the first position to provide power to the common terminal from the first power supply, and to interconnect with the second power terminal when in the second position to provide power to the common terminal from the second power supply.

According to yet another aspect of the present invention, a power management system is disclosed as including an electrical distribution panel, which includes a branch circuit breaker, interconnected with the utility power supply and configured to distribute power to at least one branch circuit. The power management system further includes a combination switch and circuit breaker assembly interconnected with the electrical distribution panel, and an auxiliary power supply that provides power to the at least one branch circuit during interruption of the utility power supply. The combination switch and circuit breaker assembly includes a switch component and a circuit breaker component and is movable between a first position in which the switch component completes a first electrical circuit including the utility power supply independent of the circuit breaker component, and a second position in which the switch component completes a second electrical circuit including the auxiliary power supply and the circuit breaker component.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
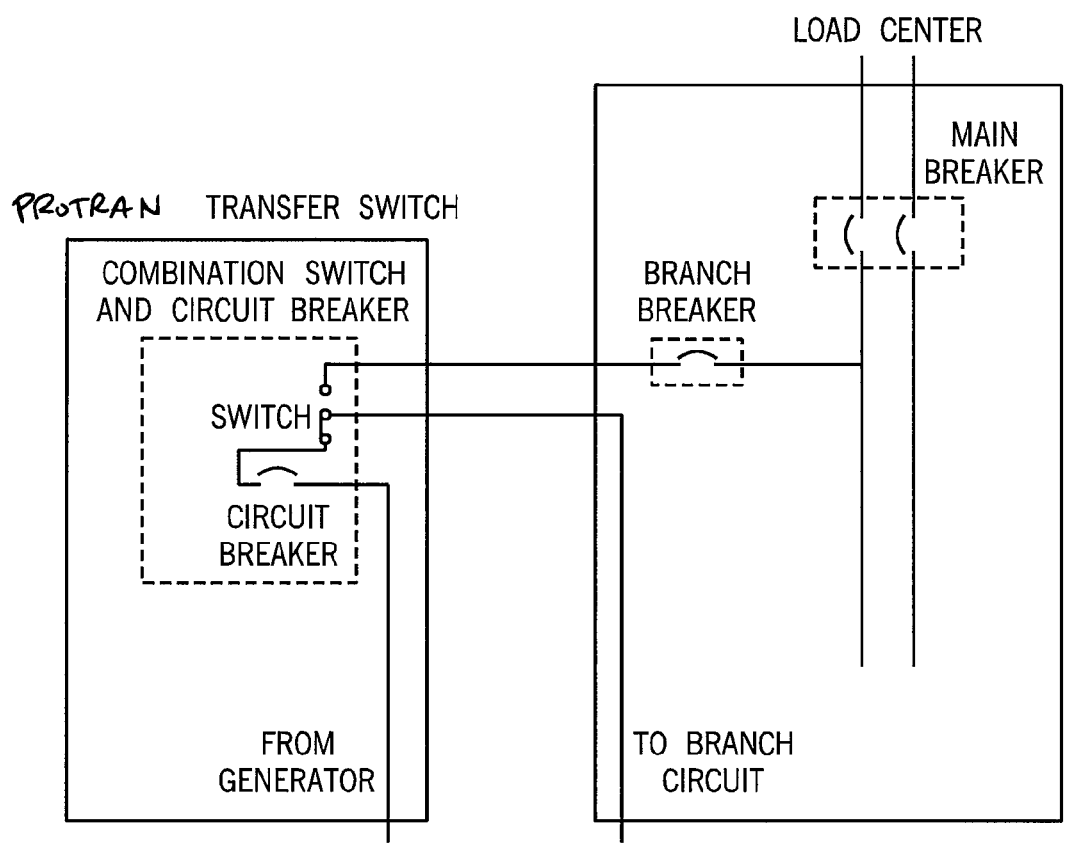
FIG. 1 is a schematic circuit diagram illustrating operation of a combination switch and circuit breaker assembly according to the present invention when power is being provided to the load by an electric generator.
Figure 2:
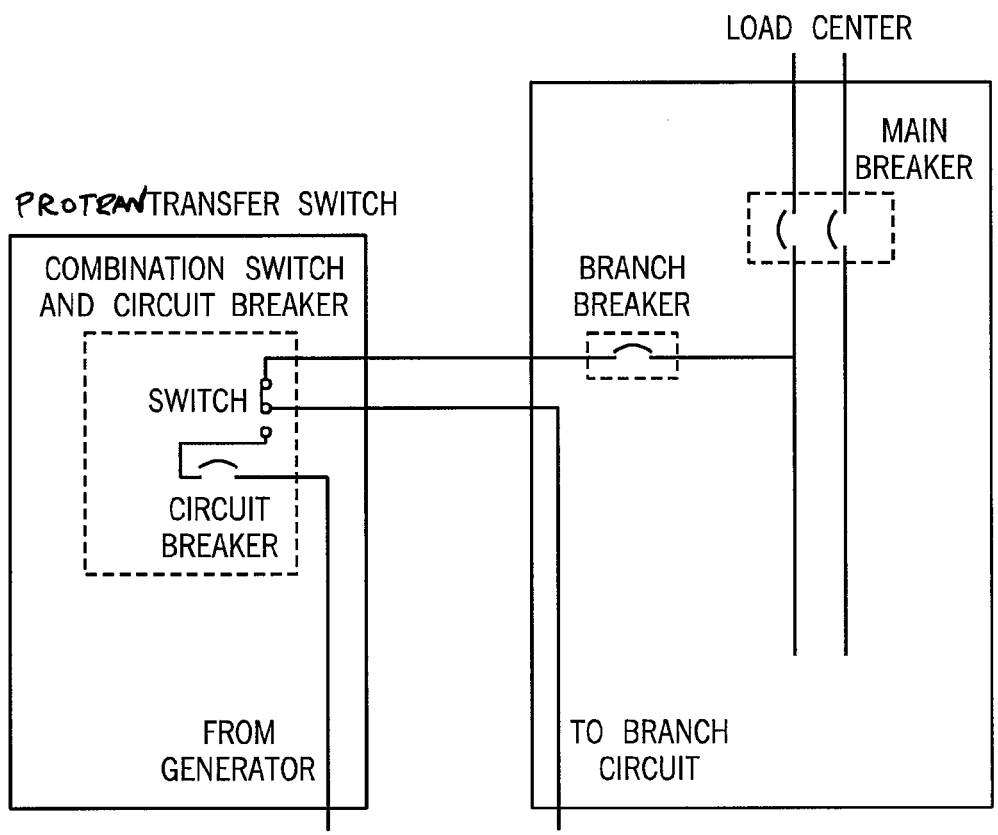
FIG. 2 is a schematic circuit diagram similar to FIG. 1 illustrating operation of the combination switch and circuit breaker assembly according to the present invention when power is being provided to the load by a utility power supply.

The present disclosure is directed to a combination switch and circuit breaker that is operative as both a switch and circuit breaker when connecting a load to an auxiliary power supply, e.g., an electric generator, as shown in FIG. 1, but is only operative as a switch when connecting the load to a main power supply, e.g., utility power, as shown in FIG. 2. More particularly, the combination switch and circuit breaker has a switch component for selectively connecting a load center branch circuit to either a main power supply or an auxiliary power supply. As shown in FIG. 1, during main power interruption, for example, the switch component of the combination switch and circuit breaker may electrically connect a branch circuit of the load center to an auxiliary power supply with a circuit breaking component providing current overload protection. However, during normal main power operation, the switch component electrically connects the load center branch circuit to main power with a branch breaker and a main breaker providing current overload protection for the branch circuit, as shown in FIG. 2. Thus, the combination switch and circuit breaker relies upon the branch breaker and main breaker for branch circuit protection rather than the built-in circuit breaker when the switch electrically connects the branch circuit to the main power supply.

Figure 3:
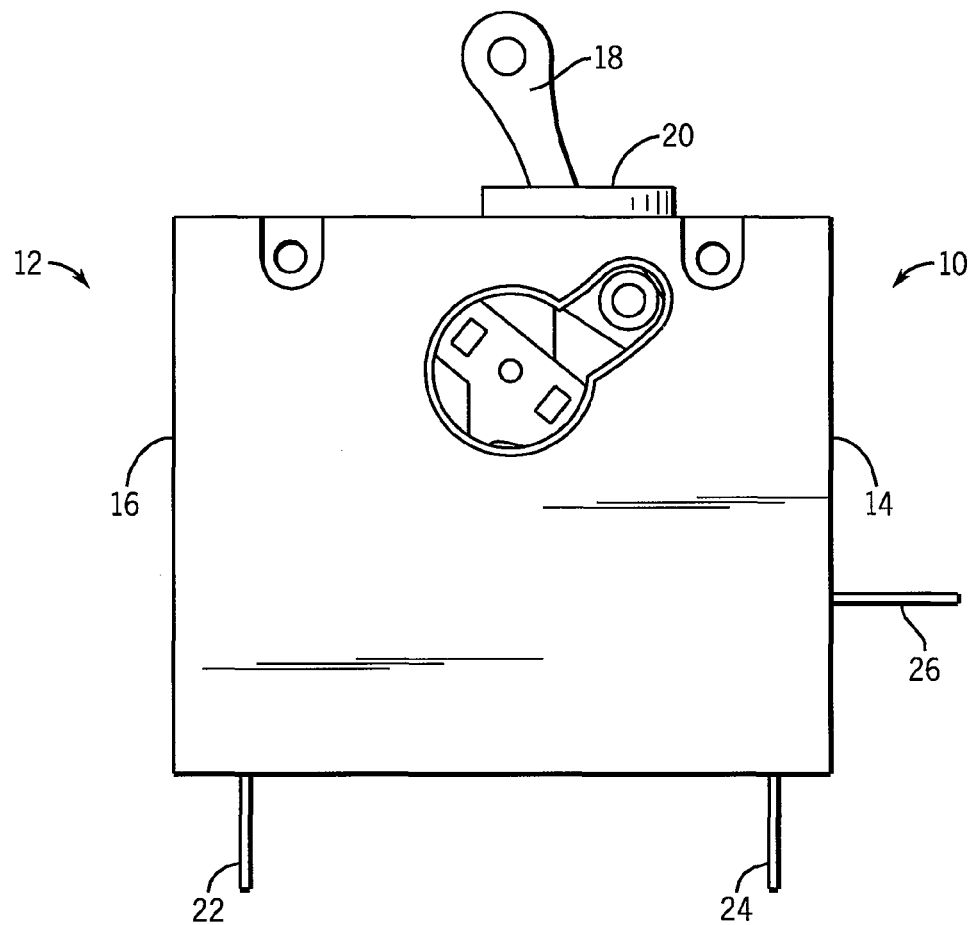
FIG. 3 is an isometric view of a combination switch and circuit breaker assembly according to one embodiment of the present invention, as incorporated into the circuits illustrated in FIGS. 1 and 2.

FIG. 3 shows a combination switch and circuit breaker 10 operable as a switch for connecting a load of a load center to either a utility power supply or an electric generator or other auxiliary power supply. When operative to connect the load to an electric generator, the combination switch and circuit breaker 10 provides current overload protection to the load. However, as noted above and further explained below, the combination switch and circuit breaker 10 is constructed so that its circuit breaking functionality is inoperable when used to connect the load to the utility power supply.

The combination switch and circuit breaker 10 includes a housing 12 composed of a front cover 14 and a back cover 16. A lever or selector handle 18 extends through an opening 20 in the housing 12 and, in one embodiment, is movable between a LINE position, as shown in FIG. 3, or a GEN position. When in the LINE position, the combination switch and circuit breaker 10 connects the load to a utility power supply or other main power supply, whereas when in the GEN position, the combination switch and circuit breaker 10 connects the load to an electric generator or other auxiliary power supply.

The combination switch and circuit breaker 10 has a common terminal 22 that extends exteriorly of the housing 12 and is constructed to interconnect with a branch circuit of a load center or breaker box that delivers power to the load. Power is received from the generator through generator input line terminal 24 that extends exteriorly of the housing 12 whereas power is received from the utility through utility input line terminal 26 that extends exteriorly of the housing 12. The combination switch and circuit breaker 10 includes a actuator that internally connects the generator input line terminal 24 to the common terminal 22 when the selector handle 18 is in the GEN position and connects the utility input line terminal 26 to the common terminal 22 when the selector handle 18 is in the LINE position. In an exemplary embodiment, the utility input line terminal 26 interconnects with the utility power supply through a branch breaker specific for the load as well as a main breaker for all branch circuits of the load center.

Figure 4:
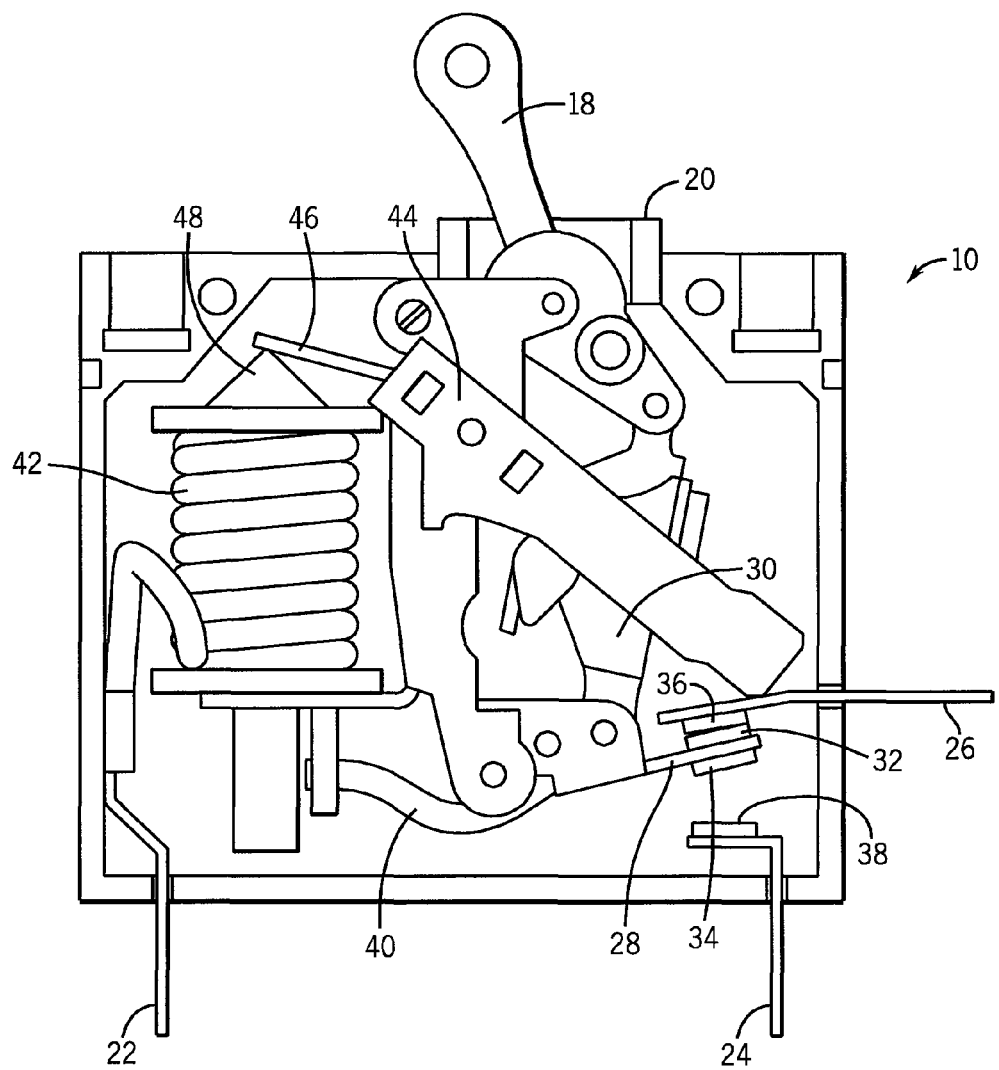
FIG. 4 is an elevation view of the combination switch and circuit breaker assembly of FIG. 3 with the cover thereof removed, showing internal components of the combination switch and circuit breaker assembly arranged in a position that corresponds with power being provided to the load by a utility power supply, as in FIG. 2.
Figure 5:
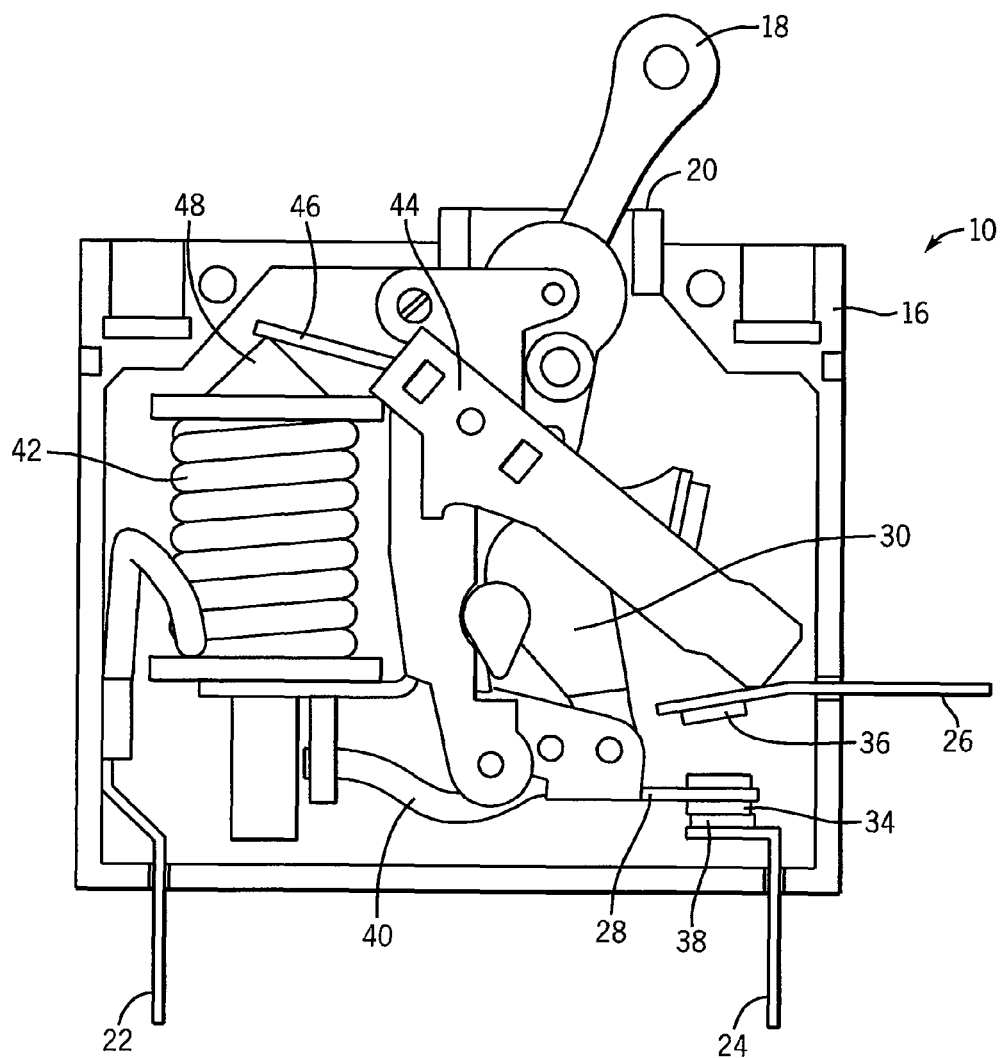
FIG. 5 is an elevation view similar to FIG. 4 showing the internal components of the combination switch and circuit breaker assembly arranged in a position that corresponds with power being provided by an electric generator, as in FIG. 1.

Referring now to FIGS. 4-5, the combination switch and circuit breaker 10 is shown with the front cover 14 removed, thereby providing visualization of some of the internal components of the combination switch and circuit breaker 10. Specifically, the combination switch and circuit breaker 10 includes an actuator 28 carried by a switch arm 30 that is interconnected with selector handle 18. The actuator 28 carries a line-side contact 32 and a generator-side contact 34. When the selector handle 18 is moved to the LINE position, shown in FIG. 4, the switch arm 30 draws the actuator 28 upward such that the line-side contact 32 engages utility input line terminal contact 36. When the selector handle is moved to the GEN position, shown in FIG. 5, the switch arm 30 forces the actuator 28 downward such that the generator-side contact 34 engages generator input line terminal contact 38.

The actuator 28 is interconnected with common terminal 22 through a lead wire 40 and an electromagnet 42. The electromagnet 42 is interconnected with a trip arm 44 such that when current through the combination switch and circuit breaker 10 exceeds a rated amperage, the electromagnet 42 will pull down tab 46 which causes trip arm 44 to pull the actuator 28 upward so as to break the connection between generator-side contact 34 and generator input line terminal contact 38. In this regard, the circuit breaking functionality of the combination switch and circuit breaker 10 is only operative when the actuator 28 is in the position shown in FIG. 5, which as described above, corresponds to the GEN position of the selector handle 18. Thus, when the selector handle 18 is in the LINE position, any current overload conditions detected by the electromagnet 42 will not trigger operation of the trip arm 44. Accordingly, when the combination switch and circuit breaker is operative to electrically connect an auxiliary power supply to a load (or branch circuit to which the load is connected), the circuit breaking functionality provided by the combination switch and circuit breaker will be available; however, when the combination switch and circuit breaker is operative to electrically connect a main power supply to a load (or branch circuit to which the load is connected), the circuit breaking functionality provided by the combination switch and circuit breaker will not be available. In the case of the latter, any circuit protection must be provided by a separate circuit breaker, such as a branch breaker or main breaker as discussed with reference to FIG. 2.

Figure 6:
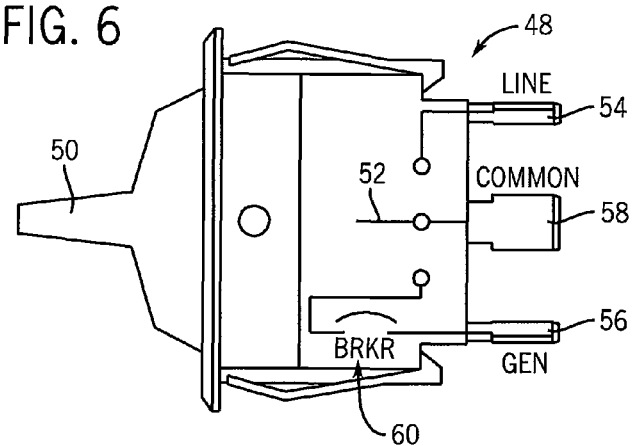
FIG. 6 is a schematic elevation view of a combination switch and circuit breaker assembly according to another embodiment of the present invention, shown in an OFF position.
Figure 7:
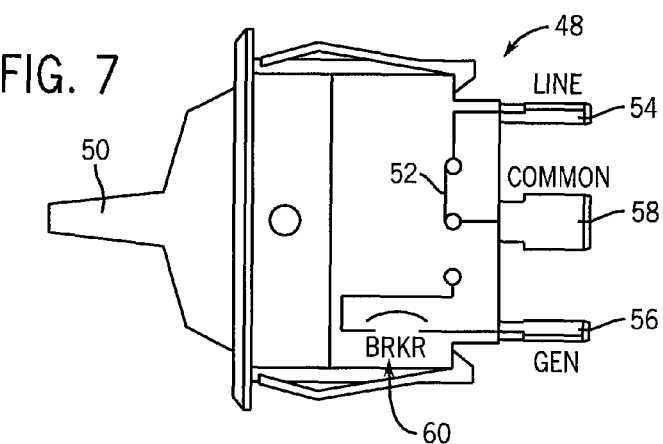
FIG. 7 is a schematic elevation view similar to FIG. 6 of the combination switch and circuit breaker assembly shown in a GEN position.
Figure 8:
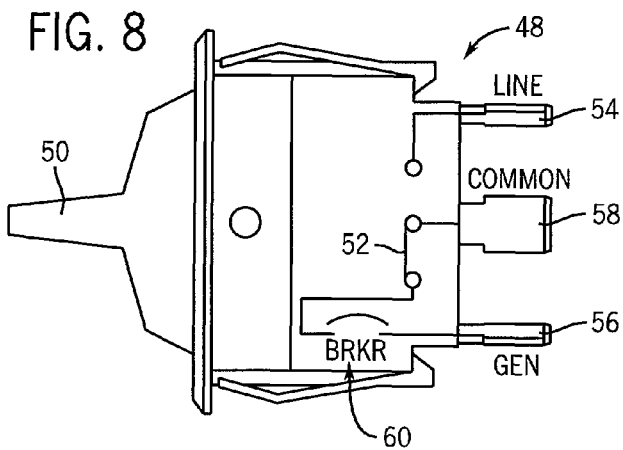
FIG. 8 is a schematic elevation view similar to FIGS. 6-7 of the combination switch and circuit breaker assembly shown in a LINE position.

FIGS. 6-8 schematically illustrate a combination switch and circuit breaker 48 according to another embodiment of the present invention. Similar to the combination switch and circuit breaker 10 described above, the combination switch and circuit breaker 48 has a selector handle 50 that is operative to place the combination switch and circuit breaker 48 in a LINE position, such as shown in FIG. 7, and a GEN position, such as shown in FIG. 8. Additionally, the selector handle 50 may also place the combination switch and circuit breaker 48 in an OFF position, such as shown in FIG. 6.

When the selector handle 50 is positioned in the COMMON position as shown in FIG. 6, actuator 52 is oriented such that contact is not made with either the utility input line terminal 54 or with the generator input line terminal 56. Thus, current provided at either line terminal 54, 56 is not conducted to common terminal 58. Similar to the combination switch and circuit breaker 10, combination switch and circuit breaker 48 has a built-in circuit breaker 60 in line with the generator input line terminal 56 and the common terminal 58.

When the selector handle 50 is positioned in the LINE position as shown in FIG. 7, the actuator 52 will connect the utility input line terminal 54 with the common terminal 58. Power delivered to the utility input line terminal 54 will be made available at the common terminal 58. As shown in the FIG. 7, the combination switch and circuit breaker 48 will not provide current protection for any load electrically connected to the common terminal 58 when being powered by utility power. On the other hand, as shown in FIG. 8, when the selector handle 50 is moved to the GEN position, the actuator 52 will electrically connect the generator input line terminal 56 to the common terminal 58 with circuit breaker 60, which provides current protection.

A combination switch and circuit breaker has been described as being operative as a circuit breaker when used to electrically connect a load to an auxiliary power supply. However, the circuit breaking functionality of the combination switch and circuit breaker is inoperable when the combination switch and circuit breaker is used to electrically connect a load to a main power supply. In the embodiment described with respect to FIGS. 3-5, the combination switch and circuit breaker is constructed such that the tripped position of the circuit breaker is not only the tripped position of the circuit breaker, but also corresponds to the closed position between the utility power supply and the load. In the embodiment described with respect to FIGS. 6-8, the combination switch and circuit breaker is constructed to have a dedicated OFF position in which both the main power supply and the auxiliary power supply are disconnected from the load.

The present invention has been described in terms of the preferred embodiment, and it is recognized that equivalents, alternatives, and modifications, aside from those expressly stated, are possible and within the scope of the impending claims.

What is claimed is:

1. A combination switch and circuit breaker assembly for connection in a power supply system that includes an electrical load, a primary power source and a secondary power source, comprising:
    a body including a manually operated handle movable between a first position and a second position;
    an electrical contact arrangement contained within the body that includes a load contact, a primary power source contact and a secondary power source contact;
    a switch mechanism disposed within the body; and
    a circuit breaker mechanism disposed within the body, wherein the circuit breaker mechanism is interconnected between the secondary power source and the secondary power source contact; and
    wherein the switch mechanism is movable in response to movement of the handle, wherein the switch mechanism establishes a connection between the load contact and the primary power source contact independent of the circuit breaker mechanism when the handle is manually moved to the first position, and wherein the switch mechanism establishes a connection between the load contact and the secondary power source through the circuit breaker mechanism when the handle is manually moved to the second position.

2. The combination switch and circuit breaker assembly of claim 1 wherein the primary power source is a utility power supply and the secondary power source is electric generator power supply.

3. A transfer switch device for connection in a power supply system that includes an electrical load, a primary power supply and a secondary power supply, comprising:
    a first power terminal connectable to the primary power supply;
    a second power terminal connectable to the secondary power supply;
    a load terminal connectable to the electrical load; and
    a combination switch and circuit breaker mechanism comprising: a body including a manually operated handle movable between a first position and a second position; a switch mechanism disposed within the body; and a circuit breaker mechanism disposed within the body, wherein the circuit breaker mechanism is interconnected between the second power supply and the second power terminal; wherein the switch mechanism is movable in response to manual movement of the handle, and establishes a connection between the load terminal and the first power terminal independent of the circuit breaker mechanism when the handle is manually moved to the first position, and wherein the switch mechanism establishes a connection between the load terminal and the second power supply through the circuit breaker mechanism when the handle is manually moved to the second position.

4. The transfer switch device of claim 3 wherein the first power supply is a utility power supply and the second power supply is electric generator power supply.

5. The transfer switch device of claim 3 wherein the handle is accessible from an exterior of the body.

6. A power management system for use with a primary power supply and an auxiliary power supply, comprising:
    an electrical distribution panel interconnected with the primary power supply and configured to distribute power to at least one branch circuit, wherein the electrical distribution panel includes a branch circuit breaker that is connected in the branch circuit; and
    a transfer switch interconnected with the electrical distribution panel, wherein the transfer switch is interconnected with the auxiliary power supply, and includes a combination switch and circuit breaker mechanism, wherein the combination switch and circuit breaker mechanism includes an electrical contact arrangement that comprises a branch circuit contact, a primary power supply contact and an auxiliary power supply contact; a switch movable between a first position and a second position; and a circuit breaker interconnected between the auxiliary power supply and the branch circuit contact, wherein, when the switch is in the first position, the switch completes a first electrical circuit including the branch circuit contact, the primary power supply contact and the branch circuit breaker in the electrical distribution panel to supply power to the branch circuit from the primary power supply independent of the circuit breaker of the transfer switch mechanism, and a wherein, when the switch is in the second position, the switch completes a second electrical circuit including the branch circuit contact, the auxiliary power supply contact and the circuit breaker of the transfer switch mechanism to supply power to the branch circuit from the auxiliary power supply through the circuit breaker of the transfer switch mechanism.

7. The power management system of claim 6 wherein the transfer switch has a transfer switch housing and the electrical distribution panel has a panel housing, and wherein the primary power supply is connected to the primary power supply contact of the combination switch and circuit breaker mechanism via a first conductor that extends between the panel housing and the transfer switch housing, and wherein the branch circuit is connected to the branch circuit contact via a second conductor that extends between the panel housing and the transfer switch housing.

8. The power management system of claim 7 wherein the electrical distribution panel includes a main circuit breaker connected between the primary power supply and the branch circuit breaker.

9. The system of claim 6 where in the primary power supply is a utility power supply and the auxiliary power supply is an electric generator.

\* \* \* \* \*